(12) United States Patent
Tachiki et al.

(10) Patent No.: US 10,465,309 B2
(45) Date of Patent: Nov. 5, 2019

(54) STEEL SHEET FOR CONTAINERS, AND METHOD FOR PRODUCING STEEL SHEET FOR CONTAINERS

(71) Applicant: NIPPON STEEL & SUMITOMO METAL CORPORATION, Tokyo (JP)

(72) Inventors: Akira Tachiki, Kitakyushu (JP); Shigeru Hirano, Kitakyushu (JP); Hirokazu Yokoya, Onga-gun (JP); Morio Yanagihara, Wuhan (CN); Yoshiaki Tani, Kitakyushu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/737,487

(22) PCT Filed: Jun. 23, 2015

(86) PCT No.: PCT/JP2015/067967
§ 371 (c)(1),
(2) Date: Dec. 18, 2017

(87) PCT Pub. No.: WO2016/207967
PCT Pub. Date: Dec. 29, 2016

(65) Prior Publication Data
US 2018/0155845 A1      Jun. 7, 2018

(51) Int. Cl.
*C25D 3/12* (2006.01)
*C25D 9/08* (2006.01)
(Continued)

(52) U.S. Cl.
CPC .............. *C25D 3/12* (2013.01); *B32B 15/015* (2013.01); *B32B 15/18* (2013.01); *B65D 65/42* (2013.01);
(Continued)

(58) Field of Classification Search
None
See application file for complete search history.

(56) References Cited

U.S. PATENT DOCUMENTS

| 6,379,521 B1 | 4/2002 | Nishio |
| 2013/0034745 A1 | 2/2013 | Tachiki et al. |

(Continued)

FOREIGN PATENT DOCUMENTS

| CN | 1882713 A | 12/2006 |
| CN | 102803561 A | 11/2012 |

(Continued)

OTHER PUBLICATIONS

International Search Report for PCT/JP2015/067967 dated Sep. 15, 2015.

(Continued)

*Primary Examiner* — Daniel J. Schleis
(74) *Attorney, Agent, or Firm* — Birch, Stewart, Kolasch & Birch, LLP (57) ABSTRACT

This steel sheet for containers includes a steel sheet, a Ni coated layer that is formed on at least one surface of the steel sheet, and a chemical treatment layer that is formed on the Ni coated layer. The Ni coated layer contains 10 mg/m$^2$ to 1,000 mg/m$^2$ of Ni in terms of an amount of metal Ni, and the chemical treatment layer contains 5 mg/m$^2$ to 30 mg/m$^2$ of a Zr compound in terms of an amount of metal Zr. An average roughness Ra of an outermost surface of the chemical treatment layer obtained with a scanning probe microscope is 10 nm to 100 nm, and when a variation amount in a yellowness index measured at one measurement point on the outermost surface of the chemical treatment layer is defined as $\Delta YI$ represented by Equation (2), an average of absolute values of the $\Delta YI$ obtained at a plurality of the measurement points included in a unit area of the outermost surface is 5.0 or less.

$$\Delta YI = YI - YI_0 \quad (2)$$

(Continued)

where

YI: the yellowness index measured after the steel sheet for containers is subjected to a retort treatment at a temperature of 130° C. for 5 hours, $YI_0$: the yellowness index measured before the retort treatment

12 Claims, 1 Drawing Sheet

(51) Int. Cl.
*B32B 15/01* (2006.01)
*B32B 15/18* (2006.01)
*B65D 65/42* (2006.01)
*C25D 5/50* (2006.01)
*C25D 7/00* (2006.01)
*C25D 7/06* (2006.01)

(52) U.S. Cl.
CPC ............... *C25D 5/50* (2013.01); *C25D 7/00* (2013.01); *C25D 7/0614* (2013.01); *C25D 9/08* (2013.01)

(56) References Cited

U.S. PATENT DOCUMENTS

| | | | |
|---|---|---|---|
| 2013/0089751 | A1 | 4/2013 | Hirano et al. |
| 2013/0209829 | A1 | 8/2013 | Suzuki et al. |
| 2013/0209830 | A1 | 8/2013 | Suzuki et al. |
| 2013/0216714 | A1 | 8/2013 | Suzuki et al. |
| 2013/0216858 | A1 | 8/2013 | Suzuki et al. |
| 2015/0064495 | A1 | 3/2015 | Hirano et al. |
| 2016/0122891 | A1 | 5/2016 | Tani et al. |

FOREIGN PATENT DOCUMENTS

| | | |
|---|---|---|
| JP | 54-68734 A | 6/1979 |
| JP | 11-264093 A | 9/1999 |
| JP | 2000-239855 A | 9/2000 |
| JP | 2005-23422 A | 1/2005 |
| JP | 2005-325402 A | 11/2005 |
| JP | 2006-9047 A | 1/2006 |
| JP | 2008-50641 A | 3/2008 |
| JP | 2009-1851 A | 1/2009 |
| JP | 2009-1853 A | 1/2009 |
| JP | 2009-84623 A | 4/2009 |
| JP | 2009-120919 A | 6/2009 |
| JP | 2010-53424 A | 3/2010 |
| JP | 2011-12344 A | 1/2011 |
| JP | 4886811 B2 | 2/2012 |
| JP | 2012-62518 A | 3/2012 |
| JP | 2012-62519 A | 3/2012 |
| JP | 2012-62520 A | 3/2012 |
| JP | 4920800 B2 | 4/2012 |
| TW | 201217588 A1 | 5/2012 |
| TW | 201504034 A | 2/2015 |
| WO | WO 2011/118588 A1 | 9/2011 |
| WO | WO 2012/002360 A1 | 1/2012 |
| WO | WO 2014/189081 A1 | 11/2014 |
| WO | WO 2016/056621 A1 | 4/2016 |
| WO | WO 2016/167357 A1 | 10/2016 |

OTHER PUBLICATIONS

Office Action for TW 104120159 dated Dec. 28, 2015.
Written Opinion of the International Searching Authority for PCT/JP2015/067967 (PCT/ISA/237) dated Sep. 15, 2015.
Chinese Office Action and Search Report for corresponding Chinese Application No. 201580081053.3, dated Oct. 9, 2018, with English translation of the Search Report.
Extended European Search Report dated Dec. 11, 2018, for Counterpart European Application No. 15896289.4.
Japanese Notice of Reasons for Rejection for counterpart Japanese Application No. 2017-524307, dated Mar. 5, 2019, with a partial English translation.

STEEL SHEET FOR CONTAINERS, AND METHOD FOR PRODUCING STEEL SHEET FOR CONTAINERS

TECHNICAL FIELD OF THE INVENTION

The present invention relates to a steel sheet for containers and a method for producing a steel sheet for containers.

RELATED ART

As containers for beverages and foods, metal containers that can be obtained by making cans using a steel sheet such as a Ni coated steel sheet, a Sn coated steel sheet, or a Sn-based alloy coated steel sheet (steel sheet for containers) are frequently used. When such a metal container is used as a container for beverages and a container for foods, it is necessary to perform coating on the surface of the metal container before can making or after can making.

However, in recent years, from the viewpoint of protecting the global environment, in order to reduce waste resulting from lacquers such as a waste solvent and exhaust gas such as carbon dioxide gas, the technique of attaching a film to a metal surface instead of coating has become popular.

In order to secure the corrosion resistance and lacquer adhesion or film adhesion, a steel sheet which is subjected to an anticorrosion treatment (chromate treatment) by chromating using hexavalent chromate or the like is used as a base material for coating or a film (for example, refer to Patent Document 1). In the steel sheet which is subjected to the chromate treatment, a coating layer formed of an organic resin is formed on the film layer (chromate film layer) formed by the chromate treatment to improve organic solvent resistance, fingerprint resistance, scratch resistance, lubricity, and the like.

However, in recent years, since hexavalent chromium used for a chromate treatment is harmful to the environment, there has been a tendency not to use the hexavalent chromium. On the other hand, since the chromate film layer has excellent corrosion resistance and lacquer adhesion or film adhesion, in the case of not performing such a chromate treatment, the corrosion resistance and lacquer adhesion or film adhesion may be significantly deteriorated.

Therefore, there has been a demand for performing an anticorrosion treatment on the surface of a steel sheet for containers instead of a chromate treatment to form an anticorrosive layer having good corrosion resistance and lacquer adhesion or film adhesion. As the anticorrosion treatments that have been proposed to replace the chromate treatment, the following methods have been proposed.

For example, Patent Documents 2 and 3 each disclose a method for performing a cathode electrolytic treatment using a chemical treatment liquid that contains a compound containing Zr and a compound containing F on a Sn coated steel sheet or a Sn coated steel sheet containing a Sn alloy.

Patent Document 4 discloses a method for performing an electrolytic treatment or another chemical treatment on a Sn coated steel sheet using a chemical treatment liquid that contains at least any one of the group consisting of a phosphate ion, a Ti ion, and a Zr ion.

Patent Document 5 discloses a metal material having an inorganic treatment layer that contains a Zr ion and a F ion and does not contain a phosphate ion, and an organic treatment layer, and a treatment method thereof.

Patent Document 6 discloses a method for performing an electrolytic treatment or an immersion treatment on a Ni coated steel sheet using a chemical treatment liquid that contains a Zr ion and organic substance.

Patent Documents 7 to 10 each disclose a method for performing an electrolytic treatment on a steel sheet using a solution that contains a Zr ion, a phosphate ion, and a nitrate ion. Particularly, Patent Document 9 discloses a method for promoting formation of a Zr film by increasing the amount of nitrate ions.

PRIOR ART DOCUMENT

Patent Document

[Patent Document 1] Japanese Unexamined Patent Application, First Publication No. 2000-239855
[Patent Document 2] Japanese Unexamined Patent Application, First Publication No. 2005-325402
[Patent Document 3] Japanese Unexamined Patent Application, First Publication No. 2005-23422
[Patent Document 4] Japanese Unexamined Patent Application, First Publication No. S54-68734
[Patent Document 5] Japanese Unexamined Patent Application, First Publication No. 2006-9047
[Patent Document 6] Japanese Unexamined Patent Application, First Publication No. 2008-50641
[Patent Document 7] Japanese Unexamined Patent Application, First Publication No. 2009-84623
[Patent Document 8] PCT International Publication No. WO2011/118588
[Patent Document 9] Japanese Patent No. 4920800
[Patent Document 10] Japanese Patent No. 4886811

DISCLOSURE OF THE INVENTION

Problems to be Solved by the Invention

As described above, Patent Documents 2 to 10 disclose the techniques of forming a film containing a Zr compound on a steel sheet by performing an electrolytic treatment on the steel sheet in a solution containing a Zr ion and a F ion. However, in these techniques, film adhesion of polyester or the like cannot be sufficiently secured in some cases.

By using an adhesive, a primer, or the like between the film and the film formed on the steel sheet, the film adhesion can be improved. However, the use of an adhesive, a primer, or the like increases the number of production processes such as a step of applying an adhesive, a primer, or the like and a baking step to secure the adhesion. Such a method is not always economical.

In the case of forming a film by a continuous electrolytic treatment, in the chemical treatment liquid containing an organic substance such as a phenol resin, the organic substance is decomposed on an anode or the phenol resin is inevitably insolubilized by interaction with a metal ion in some cases. Therefore, it is difficult to appropriately maintain the concentration of the phenol resin contained in the chemical treatment liquid in some cases.

For the above reasons, a film containing a phenol resin cannot be stably formed in some cases and thus it is desirable that the chemical treatment liquid does not contain a phenol resin.

It is necessary for a steel sheet for containers used as a container for foods to have sulfide stain resistance. In Patent Documents 2 to 10, the sulfide stain resistance is not disclosed.

In the case where the steel sheet for containers is used as a container for foods containing, for example, high protein foods such as fish, meat, and beans as a content, at least one of the inner surface of the container or the content may be discolored into black in some cases by a retort treatment (high-temperature sterilization treatment in the presence of steam) after the container is filled with foods. Such a blackening phenomenon is referred to as sulfide stain.

Sulfur contained in the food is thermally decomposed by the retort treatment to produce hydrogen sulfide ($H_2S$), thiols ($HS^-$), and the like. The hydrogen sulfide and the thiols react with the constitution metal of the inner surface of the container and thus produce a black metal sulfide. Therefore, the sulfide stain occurs.

Due to the sulfide stain, the external appearance of the container becomes poor. Further, a consumer misunderstands that the produced black metal sulfide is corrosion of the metal of the inner surface of the container or corrosion of the content. Therefore, it is necessary to prevent the sulfide stain from occurring as much as possible.

It is required for the steel sheet for containers to have weldability, corrosion resistance, and lacquer adhesion, as well as sulfide stain resistance and film adhesion.

The present invention is made in consideration of the above circumstances, and an object thereof is to provide a steel sheet for containers having excellent film adhesion, sulfide stain resistance, weldability, corrosion resistance, and lacquer adhesion and a method for producing a steel sheet for containers.

Means for Solving the Problem

In order to achieve the object by solving the above problem, the present invention employs the following means.

(1) According to an aspect of the present invention, there is provided a steel sheet for containers including: a steel sheet; a Ni coated layer that is formed on at least one surface of the steel sheet; and a chemical treatment layer that is formed on the Ni coated layer. The Ni coated layer contains 10 mg/m$^2$ to 1,000 mg/m$^2$ of Ni in terms of an amount of metal Ni, and the chemical treatment layer contains 5 mg/m$^2$ to 30 mg/m$^2$ of a Zr compound in terms of an amount of metal Zr. An average roughness Ra of an outermost surface of the chemical treatment layer obtained with a scanning probe microscope is 10 nm to 100 nm, and when a variation amount in a yellowness index measured at one measurement point on the outermost surface of the chemical treatment layer is defined as $\Delta YI$ represented by Equation (2), an average of absolute values of the $\Delta YI$ obtained at a plurality of the measurement points included in a unit area of the outermost surface is 5.0 or less.

$$\Delta YI = YI - YI_0 \quad (2)$$

where

YI: the yellowness index measured after the steel sheet for containers is subjected to a retort treatment at a temperature of 130° C. for 5 hours, $YI_0$: the yellowness index measured before the retort treatment (2) In the steel sheet for containers according to (1), the Ni coated layer may contain a Ni alloy.

(3) In the steel sheet for containers according to (1) or (2), the chemical treatment layer may contain 2 mg/m$^2$ to 20 mg/m$^2$ of a phosphate compound in terms of an amount of P.

(4) In the steel sheet for containers according to (1) or (2), the chemical treatment layer may be formed by performing a cathode electrolytic treatment in a chemical treatment liquid that contains a Zr ion and a F ion.

(5) In the steel sheet for containers according to (3), the chemical treatment layer may be formed by performing a cathode electrolytic treatment in a solution that contains a Zr ion, a F ion, and a phosphate ion.

(6) According to another aspect of the present invention, there is provided a method for producing a steel sheet for containers including: a Ni coating step of forming a Ni coated layer that contains 10 mg/m$^2$ to 1,000 mg/m$^2$ of Ni in terms of an amount of metal Ni on at least one surface of a steel sheet; a cathode electrolytic treatment step of forming a chemical treatment layer on a surface of the Ni coated layer using a chemical treatment liquid that contains at least a Zr ion and a F ion, by performing a first cathode electrolytic treatment in which the temperature of the chemical treatment liquid is 10° C. to 40° C., and a second cathode electrolytic treatment in which the temperature of the chemical treatment liquid is 45° C. to 60° C.; and a washing treatment step of performing a washing treatment using washing water at at least 40° C. or higher for 0.5 seconds or longer.

(7) The method for producing a steel sheet for containers according to (6) may include an alloying heat treatment step of alloying at least a part of the Ni coated layer after the Ni coating step.

(8) In the method for producing a steel sheet for containers according to (6) or (7), the chemical treatment liquid may contain at least one of a phosphate ion, a nitrate ion, or an ammonium ion.

EFFECTS OF THE INVENTION

According to the aspects, it is possible to provide a steel sheet for containers having excellent film adhesion, sulfide stain resistance, weldability, corrosion resistance, and lacquer adhesion, and a method for producing a steel sheet for containers.

EMBODIMENTS OF THE INVENTION

The inventors have intensively studied the applications of a chemical treatment layer that contains a Zr compound as a new film layer replacing a chromate film layer.

As a result, regarding a chemical treatment layer that contains a Zr compound or a chemical treatment layer that further contains a phosphate compound in addition to a Zr compound, it was found that excellent film adhesion, sulfide stain resistance, weldability, corrosion resistance, and lacquer adhesion which are equal to or higher than those of the chromate film layer in the related art can be obtained by defining the surface properties of a chemical treatment layer that is formed on a steel sheet and defining a difference ($\Delta YI$ value) between variations in yellowness index (YI value) after a retort treatment is performed under specific conditions, and the present invention has completed.

Hereinafter, suitable embodiments of the present invention will be described in detail.

A method for forming a chemical treatment layer that contains a Zr compound on a steel sheet, in which a Ni coated layer is formed, by performing a cathode electrolytic treatment at a low temperature followed by at a high temperature using a solution that contains a Zr ion and a F ion (a chemical treatment liquid) will be described in detail. In addition, a steel sheet for containers in which the surface roughness of the chemical treatment layer and a variation amount (ΔYI value) in the yellowness index (YI value) after a retort treatment under specific conditions are defined will be described in detail.

Figure 1:
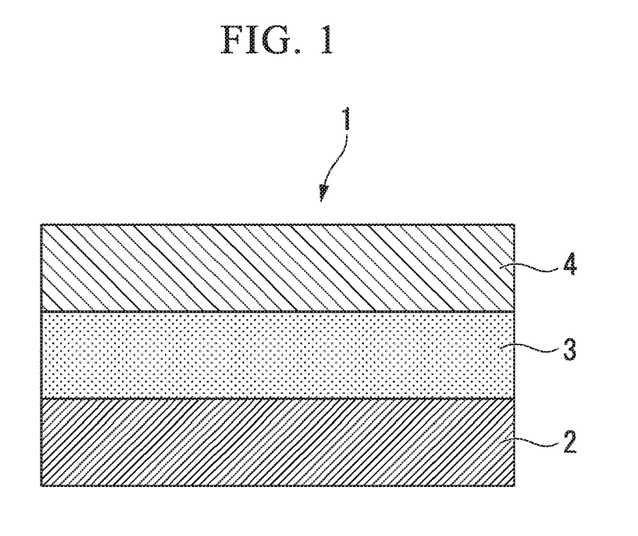
FIG. 1 is a view showing a configuration of a steel sheet for containers according to the present invention.

FIG. 1 is a view showing a configuration of a steel sheet 1 for a container according to a first embodiment of the present invention.

The steel sheet for containers 1 has a steel sheet 2, a Ni coated layer 3 that is formed on the steel sheet 2, and a chemical treatment layer 4 that is formed on the Ni coated layer 3.

The steel sheet 2 used in the embodiment is not particularly limited and a steel sheet that is typically used as a container material can be used. The method for producing the steel sheet and the material thereof are not particularly limited and the steel sheet may be produced through a typical production process such as making billet, hot rolling, pickling, cold rolling, annealing, and temper rolling.

The steel sheet for containers 1 has the Ni coated layer 3 on the steel sheet 2.

The Ni content in the Ni coated layer 3 is 10 mg/m² to 1,000 mg/m² in terms of an amount of metal Ni.

Ni has excellent lacquer adhesion, film adhesion, corrosion resistance, and weldability. However, in order to exhibit these effects, the amount of Ni required is 10 mg/m² or more in terms of the amount of metal Ni.

As the amount of metal Ni increases, the effects are enhanced. However, in the case where the amount of metal Ni is more than 1,000 mg/m², the effects are saturated. Therefore, from the economic viewpoint, the Ni content is set to 1,000 mg/m² or less in terms of the amount of metal Ni.

A preferable Ni content in the Ni coated layer 3 is 10 mg/m² or more and 800 mg/m² or less in terms of the amount of metal Ni.

The amount of metal Ni in the Ni coated layer 3 can be measured by, for example, an X-ray fluorescence method. In this case, using a sample of an adhesion amount of Ni that the amount of metal Ni is known, the calibration curve regarding the amount of metal Ni is specified in advance, and the amount of metal Ni is relatively specified using the calibration curve.

The Ni coated layer 3 may be formed on both surfaces of the steel sheet 2 or may be formed on only one surface of the steel sheet 2 from the viewpoint of production cost reduction or the like. In the case where the steel sheet 2 on which the Ni coated layer 3 is formed on only one surface of the steel sheet 2 is subjected to can making, for example, it is preferable that the steel sheet is processed such that the surface on which the Ni coated layer 3 is formed becomes the inner surface of a container.

After the Ni coated layer 3 is formed, the Ni coated layer 3 may be subjected to an alloying heat treatment. By the alloying heat treatment, at least a part of the Ni coated layer 3 is alloyed and a Ni alloy coated layer that contains a Fe—Ni alloy is formed on the steel sheet 2. The Ni alloy coated layer may contain Ni which is not partially alloyed.

In the case of using the steel sheet as the steel sheet for containers, in a state in which the surface is the Ni coated layer 3, although a film is attached to the metal surface or a lacquer is applied, sulfur contained in beverages or foods is bonded to Ni and black NiS or the like is formed.

In addition, in the case of using the steel sheet as the original sheet, for example, Fe is exposed at a Ni coated deficient portion. In this case, sulfur is bonded to Fe and thus black FeS, $Fe_2S_3$, and $Fe_2S$ are formed.

In order to reduce these blackening phenomena, the steel sheet for containers 1 has the chemical treatment layer 4 on the Ni coated layer 3.

Among the surface of the chemical treatment layer 4, the surface roughness of the surface to which the film adheres (outermost surface) will be described.

The film adhesion includes mechanical adhesion (anchoring effect and the like), chemical adhesion (primary bonding and interatomic attractive force and the like), and physical adhesion (secondary bonding and intermolecular attractive force and the like). In the embodiment, among these, as a result of particularly paying attention on mechanical adhesion, the surface roughness of the surface of the chemical treatment layer 4 (specific surface area) is defined. By increasing the surface roughness (specific surface area), mechanical adhesion (anchoring effect and the like) is increased and the film adherable area is increased. Thus, it is considered that the effect of increasing the adherable area is exhibited in the chemical adhesion (primary bonding and interatomic attractive force and the like) and the physical adhesion (secondary bonding and intermolecular attractive force and the like).

In the embodiment, it is necessary that the adhesion amount of Zr of the chemical treatment layer 4 is 5 mg/m² to 30 mg/m² in terms of an amount of metal Zr.

In the case where the adhesion amount of Zr is less than 5 mg/m², the surface roughness which will be described later cannot be stably obtained and thus this is not preferable. On the other hand, in the case where the adhesion amount of Zr is more than 30 mg/m², although the surface roughness which will be described later can be stably obtained, weldability at the time of 3 piece can formation is not sufficient. Thus, this is not preferable.

The adhesion amount of Zr of the chemical treatment layer 4 is more preferably 6 mg/m² to 15 mg/m² and even more preferably 8 mg/m² to 13 mg/m² in terms of the amount of metal Zr.

Here, the adhesion amount of Zr in the chemical treatment layer 4 can be measured by, for example, an X-ray fluorescence method. In this case, using a sample of an adhesion amount of Zr that the amount of Zr on the Ni coated layer 3 is known, the calibration curve regarding the amount of Zr is specified in advance, and the adhesion amount of Zr is relatively specified using the calibration curve.

It is required that the average roughness (Ra) of a 5 μm square flat portion at arbitrary 20 points per 1 m² is 10 nm or more and 100 nm or less on the outermost surface of the chemical treatment layer 4.

In the case where the average roughness is less than 10 nm, although the primary adhesion of the film can be secured, the film adhesion (secondary adhesion) after processing such as can making and end processing cannot be stably secured in some cases. Thus, this is not preferable. In addition, in the case where the average roughness is more than 100 nm, it is difficult to set the adhesion amount of Zr of the chemical treatment layer 4 to 5 mg/m² to 30 mg/m², defective external appearance is exhibited, and the film adhesion effect is saturated. Thus, this is not preferable.

In the case where the thickness of the film itself is less than 5 μm, the surface properties of the film attached to the surface of the container are affected by the film in some cases and thus this is not preferable. The thickness of the film to be used is preferably in a range of 5 μm to 80 μm, more preferably in a range of 10 μm to 60 μm, and even more preferably in a range of 15 μm to 45 μm.

For the method for measuring the average roughness (Ra), a device that can measure the average roughness (Ra) in the order of nm may be used. For example, a shape measuring device such as a scanning probe microscope (SPM) typified by a scanning tunneling microscope (STM) or an atomic force microscope (AFM) can be used.

The method in which the average roughness (Ra) of the 5 μm square flat portion at arbitrary 20 points per 1 m² on the outermost surface of the chemical treatment layer 4 is measured using the scanning probe microscope will be described.

The arbitrary 20 points per 1 m² means "arbitrary 20 points on a single surface in the outermost surface portion of the chemical treatment layer 4", and means measuring 40 points on both surfaces. It is preferable that the measurement points are set to points which are spaced away from each other by at least 10 cm.

Specifically, in a case of a large sheet having a dimension of 1 m×1 m, it is preferable that measurement points are sampled, and points spaced away from each other by 10 cm or more are sampled to perform measurement.

The scanning area in the measurement conditions for each point is preferably 5 μm×5 μm. In addition, the main measurement conditions such as the number of data points may be in accordance with the measurement conditions of Table 1.

The definition of the average roughness (Ra) is described in international standard ISO 4287, is an arithmetic average height of roughness curves, and is defined as an average of absolute value deviations from the average line. The average roughness may be calculated in accordance with the same definition.

TABLE 1

| Cantilever used | Manufacturing maker | NCH-10T manufactured by Nano World AG (for tapping (non-contact) mode measurement) |
|---|---|---|
| | Material | n+ single crystal silicon (conductivity: 0.01 Ωcm to 0.02 Ωcm) |
| | Spring constant | 39 N/m |
| | Resonance frequency | 326 kHz |
| | Thickness of cantilever | 4.01 μm |
| | Width of cantilever | 32 μm |
| | Length of Probe | 127 μm |
| Main measurement conditions | Kind of machine used | Nano Scope III (manufactured by Veeco Instruments Inc.) |
| | Measurement mode | Tapping (non-contact) mode |
| | Measurement image | Uneven image |
| | Scanning area | 5 μm × 5 μm |
| | Number of data points | 512 × 512 |
| | Scan rate | 0.8 Hz to 1.0 Hz |
| Cantilever excitation setting | Frequency | 290 kHz to 310 kHz |
| | Excitation voltage | 50 mV to 90 mV |

In the case of measurement using the scanning probe microscope, the roughness of the chemical treatment layer 4 is affected by the roughness of the Ni coated layer 3 or the like below the chemical treatment layer 4 in some cases. The average roughness in the embodiment refers to the roughness of the outermost surface of the chemical treatment layer 4 including the effect of the roughness of the Ni coated layer 3 or the like. In addition, in the case where the measurement surface is curved, it is preferable that the surface is appropriately corrected to be flat. Further, regarding the curved portion out of the correction range, another portion is preferably measured.

In the embodiment, it is required that the average of the absolute values of differences (ΔYI value) between variations in the yellowness indices (YI values) at arbitrary 20 points per 1 m² after the retort treatment is performed at 130° C. for 5 hours is within 5.0.

First, the retort treatment in the embodiment means that the steel sheet for containers 1 having the Ni coated layer 3 and the chemical treatment layer 4 according to the embodiment is treated using a device (high pressure steam sterilizer) for a sterilization treatment (autoclave sterilization, high pressure steam sterilization) by saturated steam at high temperature and high pressure.

An oil that is generally applied to the surface of the steel sheet for containers for the purpose of anticorrosion, such as DOS (bis (2-ethylhexyl) sebacate) or ATBC (2-(acetyloxy)-1, 2, 3-propanetricarboxylic acid tributyl), may be applied to the surface of the steel sheet for containers 1.

In the retort treatment, a state in which the temperature in the device is 130° C. is maintained for 5 hours. The 5 hour treatment time does not include temperature rising time and temperature dropping time. Since it is considered that the temperature rising time and temperature dropping time vary according to a device, it is preferable that the conditions are matched in a range of ±20 minutes.

The difference (ΔYI value) between variations in the yellowness index (YI value) means a difference between the YI value of the steel sheet for containers 1, and the YI value obtained by performing a retort treatment at 130° C. for 5 hours on the the steel sheet for containers 1 on which the surface treatment is previously performed.

The yellowness index (YI value) is a degree of discoloration of hue in a yellow direction from colorless or white, and in the case where the hue is discolored in a yellow direction from colorless or white, the yellowness index is expressed as a positive amount. The case in which the yellowness index is expressed as a negative value shows that the hue is discolored in a blue direction. The yellowness index is calculated by obtaining tristimulus values X, Y, and Z using a white measuring color difference meter, and substituting these values into Equation (1).

$$YI\ Value = 100(1.28X - 1.06Z)/Y \quad (1)$$

The yellowness index (YI value) is a value obtained by digitalizing tristimulus values of color (perception sensitivity of red, blue, and yellow that human eye can sense), and as the YI value exhibits a higher value on the positive side, the steel sheet is more likely to be tinged with yellow, and as the YI value exhibits a higher value on the negative side, the steel sheet is more likely to be tinged with bluish white.

As described above, the difference (ΔYI value) between variations in the yellowness index (YI value) means a difference between the YI value of the steel sheet for containers 1, and the YI value obtained by performing a retort treatment at 130° C. for 5 hours on the steel sheet for containers 1 on which the surface treatment is previously performed. That is, a difference (ΔYI value) between variations in the yellowness index (YI value) is calculated by Equation (2).

$$\Delta YI = YI - YI_0 \quad (2)$$

where

YI: the yellowness index measured after the steel sheet for containers is subjected to a retort treatment at a temperature of 130° C. for 5 hours, $YI_0$: the yellowness index measured before the retort treatment Accordingly, the case in which the variation amount ΔYI of the yellowness index is a positive amount shows that the yellowness index of the steel sheet for containers 1 is increased by the retort treatment. On the other hand, the case in which the variation amount ΔYI of the yellowness index is a negative amount shows that the yellowness index of the steel sheet for containers 1 is reduced by the retort treatment, and the steel sheet for containers 1 is tinged with bluish white.

The Ni coated layer 3 is visually tinged with yellow and the YI value has a positive value. By forming the chemical treatment layer 4 on the Ni coated layer 3, the YI value has a higher positive value in many cases. This is because the chemical treatment layer 4 itself is white to light yellow.

In addition, as the amount of Zr in the chemical treatment layer 4 increases, the YI value tends to have a higher positive value. This is because, as described above, the chemical treatment layer 4 itself is white to light yellow and the degree of tone of light yellow is emphasized with containing of Zr.

On the other hand, by forming the chemical treatment layer 4 on the Ni coated layer 3 and performing a retort treatment at a temperature of 130° C. for 5 hours, the ΔYI value often has a positive value in many cases. However, the ΔYI value varies by case and may be a negative value in some cases. Although described later, in the case where the ΔYI value is positive or the ΔYI value is negative, there is a correlation between the magnitude of the ΔYI value (that is, degree of variation of yellowness index) and sulfide stain resistance. Therefore, in the embodiment, the absolute value of the ΔYI value is used as an index for sulfide stain resistance.

The measurement of the yellowness index (YI value) in the embodiment may be performed using a spectral colorimeter in accordance with condition c of HS Z-8722. For the measurement method of the yellowness index (YI value), SCI (including regular reflection light) measurement which is hardly affected by the surface properties is performed. For the measurement conditions of the yellowness index (YI value), measurement must be performed under predetermined conditions including the light source, humidity, temperature, and the like.

In the embodiment, the ΔYI value which is a variation amount in the yellowness index (YI value) is used as an index for indicating the degree of coating of the Ni coated layer 3 and the chemical treatment layer 4. In the case where the Ni coated layer 3 or the chemical treatment layer 4 is defective, the ΔYI value which is a variation amount in the yellowness index (YI value) has a high value. On the other hand, in the case where the Ni coated layer 3 or the chemical treatment layer 4 is not defective, the ΔYI value which is a variation amount in the yellowness index (YI value) has a low value.

Examples of the case in which the Ni coated layer 3 or the chemical treatment layer 4 is defective include a case in which the chemical treatment layer 4 is nonuniformly formed due to a finely porous defect, and a case in which the Ni coated layer 3 is oxidized by the retort treatment.

In each measurement point, the absolute value of the ΔYI value is specified by the above method and all of the obtained "absolute values of the ΔYI values" is averaged by the number of measurement points. In the embodiment, this value is set to the average of the absolute values of the differences (ΔYI values) of variations in the yellowness index (YI value) at arbitrary 20 points per 1 m² after a retort treatment is performed at 130° C. or less for 5 hours.

In the case where the average of the absolute values of the ΔYI values is within 5.0, dense and uniform Ni coated layer 3 and chemical treatment layer 4 are formed.

In the case where the average of the absolute values of the ΔYI values is more than 5.0, dense and uniform Ni coated layer 3 and/or chemical treatment layer 4 is not formed.

Thus, the average of the absolute values of the ΔYI values is 5.0 or less. The average of the absolute values of the ΔYI values is preferably 3.0 or less, more preferably 1.0 or less, and even more preferably 0.5 or less.

The inventors have found that the absolute values of the ΔYI values before and after the retort treatment represent the degree of coating of the chemical treatment layer 4 and there is a correlation between the sulfide stain resistance and the ΔYI value. That is, in the case where the average of the absolute values of the ΔYI values is a high value, the steel sheet for containers 1 does not have excellent sulfide stain resistance, and in the case where the average of the absolute values of the ΔYI values is a low value, the steel sheet for containers 1 has excellent sulfide stain resistance.

In the retort treatment, since a water molecule or an oxygen molecule enters the chemical treatment layer 4 from a portion with a low coating degree, a metal such as Ni in the Ni coated layer 3 which is below the chemical treatment layer 4, further iron in the steel sheet 2, is oxidized. That is, the oxidation state of the metal such as Ni and iron by the retort treatment is affected by the degree of coating of the Ni coated layer 3 and the chemical treatment layer 4.

On the other hand, the ΔYI value represents a variation amount in the yellowness index of the steel sheet for containers 1. Here, the yellowness index of the steel sheet for containers 1 is affected by the oxidation state of the metal such as Ni and iron and the Zr content of the chemical treatment layer 4.

Therefore, it is considered that the average of the absolute values of the ΔYI values represents the degree of coating of the chemical treatment layer 4 (the degree of uniformity and density).

On the other hand, since a hydrogen sulfide molecule, a thiol ion, or a sulfur molecule enters the chemical treatment layer 4 from a portion with a low coating degree (the degree of uniformity and density), the metal such as Ni in the Ni coated layer 3 which is below the chemical treatment layer 4, further iron in the steel sheet 2, is sulfurized. As a result, a metal sulfide is formed to cause the sulfide stain. That is, the sulfide stain resistance is affected by the degree of coating (the degree of uniformity and density) of the Ni coated layer 3 and the chemical treatment layer 4.

For the above reasons, it is considered that the ΔYI value which represents the variation amount in the yellowness index of the steel sheet for containers 1 and the sulfide stain resistance have a correlation.

The inventors have considered that since the steel sheet for containers 1 has excellent film adhesion and excellent sulfide stain resistance, it is required to form two layers having different functions for the chemical treatment layer 4.

Based on the finding, the chemical treatment layer 4 has a uniform and dense layer on the Ni coated layer 3 to make an extraneous molecule such as a water molecule or a hydrogen sulfide molecule hardly penetrate the layer from the surface, and has a layer with high roughness on the uniform and dense layer to secure the film adhesion.

In the specification, the former uniform and dense layer is referred to as a first chemical treatment layer and the latter layer with high roughness is referred to as a second chemical treatment layer.

In the embodiment, the chemical treatment layer 4 is formed to secure the sulfide stain resistance, corrosion resistance, and film adhesion. It is considered that the Zr compound contained in the chemical treatment layer 4 is a Zr hydrated oxide constituted of a Zr oxide and a Zr hydroxide. In the case where the chemical treatment liquid further contains a phosphate ion, it is considered that the Zr compound contained in the chemical treatment layer 4 is a Zr hydrated oxide-phosphate compound. These Zr compounds have excellent sulfide stain resistance, corrosion resistance, and film adhesion.

Accordingly, in the case where the amount of the Zr compound in the chemical treatment layer 4 is increased, the sulfide stain resistance, corrosion resistance, and film adhesion are improved. In the case where the amount of the Zr compound in the chemical treatment layer 4 is 4 mg/m$^2$ or more in terms of the amount of metal Zr, the effects are exhibited.

The amount of the Zr compound in the first chemical treatment layer is preferably 4 mg/m$^2$ or more, more preferably 6 mg/m$^2$ or more, and even more preferably 8 mg/m$^2$ or more in terms of the amount of metal Zr.

The amount of the Zr compound in the second chemical treatment layer is preferably 1 mg/m$^2$ or more, more preferably 3 mg/m$^2$ or more, and even more preferably 6 mg/m$^2$ or more in terms of the amount of metal Zr.

As the amount of the Zr compound increases, the sulfide stain resistance, corrosion resistance, and film adhesion are improved. However, in the case where the total amount of the Zr compound contained in the first chemical treatment layer and the second chemical treatment layer is more than 30 mg/m$^2$ in terms of the amount of metal Zr, the thickness of the chemical treatment layer 4 is excessively increased and the adhesion of the chemical treatment layer 4 itself is deteriorated. Further, since the electric resistance of the chemical treatment layer 4 is increased, weldability is deteriorated.

Further, in the case where the total amount of the Zr compound contained in the first chemical treatment layer and the second chemical treatment layer is more than 30 mg/m$^2$ in terms of the amount of metal Zr, a powdered Zr compound is precipitated on the surface in some cases.

Accordingly, the amount of the Zr compound in the first chemical treatment layer is preferably 20 mg/m$^2$ or less, more preferably 15 mg/m$^2$ or less, and even more preferably 10 mg/m$^2$ or less in terms of the amount of metal Zr.

In addition, the amount of the Zr compound in the second chemical treatment layer is preferably 10 mg/m$^2$ or less, more preferably 8 mg/m$^2$ or less, and even more preferably 5 mg/m$^2$ or less in terms of the amount of metal Zr.

In consideration of the above description, the total amount of the Zr compound contained in the chemical treatment layer 4 is set to 5 mg/m$^2$ to 30 mg/m$^2$ in terms of the amount of metal Zr.

In the case where the amount of the phosphate compound in the chemical treatment layer 4 such as a Zr-phosphate compound is increased, further excellent sulfide stain resistance, corrosion resistance, and film adhesion are exhibited. However, the effect can be recognized in the case where the amount of the phosphate compound is 0.5 mg/m$^2$ or more in terms of an amount of P, and the effect can be apparently recognized in the case where the amount of the phosphate compound is 2 mg/m$^2$ or more in terms of the amount of P.

Accordingly, the amount of the phosphate compound in the first chemical treatment layer such as a Zr-phosphate compound is preferably 2 mg/m$^2$ or more, more preferably 3 mg/m$^2$ or more, and even more preferably 4 mg/m$^2$ or more in terms of the amount of P.

In addition, the amount of the phosphate compound in the second chemical treatment layer such as a Zr-phosphate compound is preferably 0.5 mg/m$^2$ or more, more preferably 1.5 mg/m$^2$ or more, and even more preferably 3 mg/m$^2$ or more in terms of the amount of P.

On the other hand, in the case where the amount of the phosphate compound such as a Zr-phosphate compound is increased, the sulfide stain resistance, corrosion resistance, and film adhesion are improved. However, in the case where the amount of the phosphate compound in the chemical treatment layer 4 such as a Zr-phosphate compound is more than 20 mg/m$^2$ in terms of the amount of P, the phosphate compound such as a Zr-phosphate compound is excessively thickened. Therefore, the adhesion of the phosphate compound itself is deteriorated and the electric resistance of the chemical treatment layer 4 is increased, thereby deteriorating weldability. Further, a powdered Zr—P compound is precipitated on the surface in some cases.

Accordingly, the amount of the phosphate compound in the first chemical treatment layer such as a Zr-phosphate compound is preferably 15 mg/m$^2$ or less, more preferably 10 mg/m$^2$ or less, and even more preferably 8 mg/m$^2$ or less in terms of the amount of P.

In addition, the amount of the phosphate compound in the second chemical treatment layer such as a Zr-phosphate compound is preferably 8 mg/m$^2$ or less, more preferably 5 mg/m$^2$ or less, and even more preferably 3 mg/m$^2$ or less in terms of the amount of P.

As described above, the total amount of the phosphate compound contained in the first chemical treatment layer and the second chemical treatment layer such as a Zr-phosphate compound is preferably set to 2 mg/m$^2$ to 20 mg/m$^2$ in terms of the amount of P. The amount of the phosphate compound such as a Zr-phosphate compound is more preferably 4 mg/m$^2$ to 15 mg/m$^2$ and the amount of the phosphate compound such as a Zr-phosphate compound is even more preferably 2.5 mg/m$^2$ to 10 mg/m$^2$.

Although the details will be described later, it is preferable that the chemical treatment liquid does not contain a phenol resin to stably form the chemical treatment layer 4. Therefore, it is preferable that the chemical treatment layer 4 does not contain a phenol resin.

The amounts of metal Zr and P contained in the chemical treatment layer 4 and the amount of metal Ni contained in the Ni coated layer 3 in the embodiment can be measured by, for example, a quantitative analysis method such as an X-ray fluorescence method. In this case, using a sample of an adhesion amount of Ni that the amount of metal Ni is known, the calibration curve regarding the amount of metal Ni can be specified in advance, and the amount of metal Ni in the Ni coated layer 3 can be relatively specified using the calibration curve.

In addition, using a sample of an adhesion amount of Ni that the amount of metal Zr is known and a sample of an adhesion amount of Ni that the amount of P is known, the calibration curve regarding the amount of metal Zr and, the calibration curve regarding the amount of P can be specified in advance, and the amounts of metal Zr and P can be relatively specified using the calibration curves.

Hereinafter, a method for producing the steel sheet for containers 1 according to the embodiment will be described.

Figure 2:
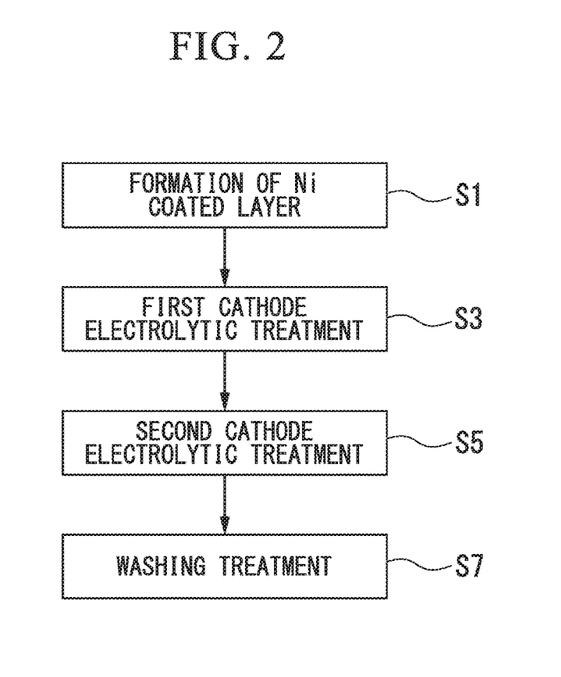
FIG. 2 is a flowchart showing an example of a method for producing a steel sheet for containers according to the present invention.

FIG. 2 is a flowchart showing an example of a method for producing the steel sheet for containers 1 according to the embodiment.

In the embodiment, the Ni coated layer 3 is formed on at least one surface of the steel sheet 2 (Step S1). The method for forming the Ni coated layer 3 is not particularly limited. For example, a known technique such as an electro coating method, a vacuum deposition method, or a sputtering method may be used.

In addition, as described above, after the Ni coated layer 3 is formed, the Ni coated layer 3 may be subjected to an alloying heat treatment. Through the alloying heat treatment, a Ni alloy coated layer containing a Fe—Ni alloy is formed on the steel sheet 2. The Ni alloy coated layer may contain Ni which is not partially alloyed.

As the conditions for the allying heat treatment, for example, a heat treatment is performed in a nonoxidizing atmosphere of 3 vol % hydrogen and 97 vol % nitrogen at 650° C. to 850° C. for 20 sec to 50 sec.

Examples of the method for forming the chemical treatment layer 4 include an immersion treatment and a cathode electrolytic treatment.

The immersion treatment is a method for immersing the steel sheet 2 on which the Ni coated layer 3 is formed in an acid solution obtained by dissolving a Zr ion and a F ion (as required, a phosphate ion). However, since the chemical treatment layer 4 is formed by etching the base material in the immersion treatment, the adhesion of the chemical treatment layer 4 is not uniform. In addition, since the time required for forming the chemical treatment layer 4 is increased, this method is disadvantageous in terms of industrial production.

On the other hand, in the cathode electrolytic treatment, the surface of the chemical treatment layer 4 to be formed is cleaned by hydrogen generation in forced charge transfer and at the interface between the steel sheet 2 and the chemical treatment liquid. In addition, in the cathode electrolytic treatment, the pH of the chemical treatment liquid is raised, thereby promoting the adhesion of the chemical treatment layer 4.

For the above reasons, by performing the cathode electrolytic treatment on the steel sheet 2 on which the Ni coated layer 3 is formed, a uniform chemical treatment layer 4 can be formed.

In the embodiment, by performing the cathode electrolytic treatment on the steel sheet 2 on which the Ni coated layer 3 is formed in the chemical treatment liquid containing a Zr ion and a F ion, a chemical treatment layer 4 containing a Zr oxide is formed. By performing the cathode electrolytic treatment in the chemical treatment liquid to which a phosphate is added, a chemical treatment layer 4 containing a Zr oxide and a Zr phosphate compound is formed.

In the method for producing the steel sheet for containers 1 according to the embodiment, the chemical treatment layer 4 is formed by a cathode electrolytic treatment using at least two or more cathode electrolytic treatment tanks. In the cathode electrolytic treatment, a first cathode electrolytic treatment in which the temperature of the chemical treatment liquid is set to 10° C. to 40° C. (Step S3) is performed and then subsequently a second cathode electrolytic treatment in which the temperature of the chemical treatment liquid is set to 45° C. to 60° C. (Step S5) is performed.

Through the above first cathode electrolytic treatment, a first chemical treatment layer is formed on the Ni coated layer 3. Through the above second cathode electrolytic treatment, a second chemical treatment layer is formed on the first chemical treatment layer.

By performing the first cathode electrolytic treatment in which the temperature of the chemical treatment liquid is set to 10° C. to 40° C., the dense first chemical treatment layer is formed to secure the sulfide stain resistance and corrosion resistance.

By performing the second cathode electrolytic treatment in which the temperature of the chemical treatment liquid is set to 45° C. to 60° C., the second chemical treatment layer is formed to mainly secure the film adhesion and lacquer adhesion.

Only with the second cathode electrolytic treatment, it is considered that the formation of the chemical treatment layer 4 containing a Zr compound is effectively promoted, however, the density of the chemical treatment layer 4 is not sufficient, that is, the chemical treatment layer 4 having a finely porous defect is obtained. Therefore, it is difficult to secure the sulfide stain resistance and corrosion resistance in some cases.

The temperature of the chemical treatment liquid in the first cathode electrolytic treatment is 10° C. to 40° C.

In the case where the temperature of the chemical treatment liquid is lower than 10° C., it is required to enhance the capacity of a cooling device. Even in the case where the temperature of the chemical treatment liquid is lowered to a temperature less than 10° C., the density of the chemical treatment layer 4 is saturated and thus a denser chemical treatment layer 4 cannot be formed. In the case where the temperature of the chemical treatment liquid is lower than 10° C., the formation speed of the chemical treatment layer 4 is slow. In the case where the temperature of the chemical treatment liquid is lower than 10° C., the solubility of the components of the chemical treatment liquid is lowered and thus insoluble matter is formed. For the above reasons, it is not preferable that the temperature of the chemical treatment liquid is lower than 10° C.

On the other hand, in the case where the temperature of the chemical treatment liquid is higher than 40° C., a denser chemical treatment layer 4 cannot be formed and it is difficult to secure the sulfide stain resistance and corrosion resistance. Therefore, it is difficult to exhibit the function of the above first chemical treatment layer.

The temperature of the chemical treatment liquid in the first cathode electrolytic treatment is preferably 20° C. to 35° C.

The temperature of the chemical treatment liquid in the second cathode electrolytic treatment is 45° C. to 60° C.

In the case where the temperature of the chemical treatment liquid is lower than 45° C., it is difficult to secure the surface roughness that is defined in the embodiment.

On the other hand, in the case where the temperature of the chemical treatment liquid is higher than 60° C., the surface roughness that is defined in the embodiment can be secured. However, the stability of the chemical treatment liquid cannot be secured. Particularly, in the case of continuously performing the cathode electrolytic treatment, a F complex component of Zr or the like is gradually decomposed and becomes insoluble matter, and the insoluble matter is suspended in the chemical treatment liquid. Thus, the insoluble matter adheres to the surface of the chemical treatment layer 4 or the like to cause an adverse effect.

The temperature of the chemical treatment liquid in the second cathode electrolytic treatment is preferably 45° C. to 55° C.

In the case where the sheet threading speed is faster than 150 m/minute, it is required that the temperature of the chemical treatment liquid in the second cathode electrolytic treatment is set to a high temperature 10° C. or more higher than the temperature of the chemical treatment liquid in the first cathode electrolytic treatment. This is because, for example, in some cases, as the sheet threading speed increases, the temperature of the chemical treatment liquid of the second cathode electrolytic treatment tank is lowered by the chemical treatment liquid of the first cathode electrolytic treatment tank adhering to the steel sheet and entering the second cathode electrolytic treatment tank, and as a result, the second chemical treatment layer of the chemical treatment layer 4 of the present invention may be prevented from being effectively formed.

Although current density varies depending on the structure of a cathode electrolytic treatment device or in the case of a long steel sheet, the sheet threading speed, the current density is, for example, 0.1 A/dm$^2$ to 20 A/dm$^2$.

In the method for producing the steel sheet for containers 1 of the embodiment, it is preferable to use at least two or more cathode electrolytic treatment tanks. This is because at least one tank functions as a cathode electrolytic treatment tank for the first cathode electrolytic treatment and at least one tank functions as a cathode electrolytic treatment tank for the second cathode electrolytic treatment.

The cathode electrolytic treatment tank may be of a vertical type or a horizontal type and is not particularly limited as long as the tank has a structure capable of performing a cathode electrolytic treatment on the front and rear surfaces of the steel sheet 2.

In the embodiment, as the chemical treatment liquid, a known chemical treatment liquid can be used. For example, as described in Patent Documents 9 and 10, the chemical treatment liquid containing 100 ppm to 7,500 ppm of Zr ions and 120 ppm to 4,000 ppm of F ions can be used.

In addition, as the chemical treatment liquid to be used in the cathode electrolytic treatment, a chemical treatment liquid containing 50 ppm to 5,000 ppm of phosphate ions, 20,000 ppm or less of nitrate ions, ammonium ions and the like, in addition to the Zr ions and F ions, may be used.

The pH of the chemical treatment liquid is preferably in a range of 3.0 to 4.5. The pH may be appropriately adjusted such that in the case of an attempt to lower the pH, nitrate or the like is added and in the case of an attempt to raise the pH, ammonium or the like is added.

In order to secure further excellent film adhesion, sulfide stain resistance, and corrosion resistance, it is preferable that not only a Zr ion and a F ion, but also a phosphate ion are added.

It is more preferable that a nitrate ion is contained in the chemical treatment liquid together with an ammonium ion. The treatment time for the cathode electrolytic treatment can be shortened by containing the above ions in the chemical treatment liquid. In addition, by containing the above ions in the chemical treatment liquid, the precipitation of the chemical treatment layer 4 containing a Zr oxide and a Zr-phosphate compound contributing to improving the corrosion resistance and film adhesion can be promoted. Thus, the containing of the above ions in the chemical treatment liquid is very advantageous in terms of industrial production.

Accordingly, for the formation of the chemical treatment layer 4 of the embodiment, although the cathode electrolytic treatment is used, it is more desirable to perform the cathode electrolytic treatment using the chemical treatment liquid containing a nitrate ion and an ammonium ion.

When a film layer is formed by performing a continuous electrolytic treatment using a chemical treatment liquid containing an organic substance such as a phenol resin, the organic substance is decomposed on an anode or the organic substance such as a phenol resin is inevitably insolubilized by interaction with a metal ion in some cases. Therefore, it is difficult to appropriately maintain the concentration of the organic substance such as a phenol resin contained in the chemical treatment liquid.

For the above reason, since there is a case in which a film containing a phenol resin cannot be stably formed and thus it is desirable that the chemical treatment liquid does not contain a phenol resin.

Since the chemical treatment liquid contains a F ion, the F ion is contained in the chemical treatment layer 4 with the Zr compound. Although the primary lacquer adhesion is not affected by the F ion in the chemical treatment layer 4, the secondary lacquer adhesion and corrosion resistance are deteriorated due to the F ion. This is because due to the elution of the F ion in the chemical treatment layer 4 into steam and a corrosive liquid, the F ion decomposes the bonding of the chemical treatment layer 4 and an organic film layer such as a film and a lacquer or corrodes the steel sheet 2.

In order to reduce the amount of the F ion in the chemical treatment layer 4, the second cathode electrolytic treatment is performed and then the steel sheet for containers 1 is subjected to a washing treatment (Step S7). Examples of the washing treatment include an immersion treatment and a spraying treatment.

The amount of the F ion in the chemical treatment layer 4 can be reduced by increasing the temperature of washing water used for the washing treatment and increasing the treatment time for the washing treatment.

In order to reduce the amount of the F ion in the chemical treatment layer 4, an immersion treatment or a spraying treatment using washing water at 40° C. or higher may be performed for 0.5 seconds or longer. In the case where the temperature of the washing water is lower than 40° C. or the treatment time is shorter than 0.5 seconds, the amount of F ion in the chemical treatment layer 4 cannot be reduced and the above properties cannot be exhibited.

Not only the F ion, but also the nitrate ion and the ammonium ion in the chemical treatment liquid are also contained in the chemical treatment layer 4 together with the Zr compound in some cases. In the case of reducing the amounts of these ions, a washing treatment using the washing water by an immersion treatment or a spraying treatment may be performed.

In the case of reducing the amounts of the nitrate ion and the ammonium ion in the chemical treatment layer 4, the amounts of the nitrate ion and the ammonium ion can be reduced by increasing the temperature of the washing water or increasing the treatment time.

It is preferable that the F ion, the nitrate ion, and the ammonium ion are removed from the chemical treatment layer 4 as much as possible by the immersion treatment or spraying treatment. However, these ions may not be necessary completely removed and may inevitably remain.

EXAMPLES

Hereinafter, Examples and Comparative Examples of the present invention will be described and the results thereof will be shown in Table 5. The examples shown below are merely illustrative examples of the steel sheet for containers and the method for producing a steel sheet for containers according to the embodiment of the present invention and the steel sheet for containers and the method for producing a steel sheet for containers according to the embodiment of the present invention are not limited to the following examples.

<Preparation of Ni Coated Steel Sheet>

(A1) A steel sheet which had been subjected to annealing and temper rolling after cold rolling was degreased and pickled and then both surfaces were coated with Ni using a Watt bath having a composition of 75 g/L of nickel sulfate hexahydrate, 140 g/L of nickel chloride hexahydrate, and 40 g/L of boric acid, with a pH of 4 under the conditions at a bath temperature of 50° C. and a current density of 5 A/dm$^2$ to prepare a Ni coated steel sheet. The adhesion amount was adjusted with the electrolysis time.

(A2) Both surfaces of a cold-rolled steel sheet were coated with Ni using a Watt bath having a composition of 240 g/L of nickel sulfate, 45 g/L of nickel chloride, and 30 g/L of boric acid under the conditions at a bath temperature of 50° C. and a current density of 5 A/dm$^2$ and then an alloying heat treatment was performed to form a Ni diffused layer. Further, the both surfaces were degreased and pickled to prepare a Ni coated steel sheet. The adhesion amount was adjusted with the electrolysis time.

The adhesion amount of Ni coated of the obtained Ni coated steel sheet was measured by an X-ray fluorescence method. Regarding the above (A1) and (A2), the minimum value, the optimum value, and the maximum value of the adhesion amount of Ni coated are as shown in Table 2 below respectively.

TABLE 2

|  | A1 | A2 |
|---|---|---|
| Amount of metal nickel (mg/m$^2$) (Minimum value-optimum value-maximum value) | 10-550-1000 | 10-550-1000 |

<Formation of Chemical Treatment Layer>

The Ni coated steel sheet prepared by the methods of the above (A1) or (A2) was immersed in a chemical treatment liquid containing various kinds of ions shown in Table 3, and was subjected to a cathode electrolytic treatment under the conditions of the number of times of energization and the temperature shown in Table 4. The chemical treatment liquid is a treatment liquid that ammonium hexafluorozirconate (IV), hydrogen fluoride, ammonium nitrate, and phosphate were dissolved in distilled water and the pH Thereof was Adjusted to 3.5.

<Washing Treatment>

The chemical treatment layer was formed by the above treatment and then the steel sheet was immersed in distilled water at 20° C. to 40° C. for 0.5 seconds to 5 seconds. Then, the steel sheet was immersed in distilled water at 80° C. to 90° C. for 0.5 seconds to 3 seconds.

The adhesion amount of Zr and the adhesion amount of P were adjusted by adjusting the current density (0.5 A/dm$^2$ to 30 A/dm$^2$) and the electrolysis time (for 0.5 seconds to 5 seconds).

TABLE 3

| Kinds of ions (ppm) | B1 | B2 | B3 | B4 |
|---|---|---|---|---|
| Zr | 3,000 | 1,500 | 1,400 | 1,400 |
| PO$_4$ | — | — | 950 | 950 |
| T-F | 4,000 | 2,000 | 2,000 | 2,000 |
| NO$_3$ | — | 3,000 | 1,600 | 7,000 |
| NH$_4$ | — | 2,000 | 1,000 | 2,500 |

TABLE 4

| | Ni coating step | | | | Cathode electrolytic treatment step | | | | |
| | | | | | First cathode electrolytic treatment | | Second cathode electrolytic treatment | | |
| Level | Production method | Adhesion amount of Ni coated (mg/m$^2$) | Alloying heat treatment | Chemical treatment liquid | Temperature of chemical treatment liquid (° C.) | Number of times of energization (times) | Temperature of chemical treatment liquid (° C.) | Number of times of energization (times) | Remark |
|---|---|---|---|---|---|---|---|---|---|
| 1 | A1 | 550 | Not performed | B1 | 10 | 6 | 45 | 2 | Example |
| 2 | A1 | 550 | Not performed | B1 | 30 | 2 | 60 | 1 | Example |
| 3 | A1 | 550 | Not performed | B2 | 40 | 1 | 50 | 1 | Example |
| 4 | A1 | 550 | Not performed | B2 | 25 | 8 | 60 | 2 | Example |
| 5 | A1 | 600 | Not performed | B3 | 40 | 2 | 45 | 2 | Example |
| 6 | A1 | 980 | Not performed | B3 | 30 | 6 | 55 | 2 | Example |
| 7 | A1 | 500 | Not performed | B3 | 30 | 8 | 60 | 2 | Example |
| 8 | A1 | 500 | Not performed | B3 | 30 | 8 | 60 | 2 | Example |
| 9 | A1 | 500 | Not performed | B3 | 10 | 2 | 50 | 1 | Example |
| 10 | A1 | 12 | Not performed | B2 | 20 | 1 | 50 | 1 | Example |
| 11 | A2 | 980 | Performed | B2 | 25 | 4 | 50 | 2 | Example |
| 12 | A2 | 300 | Performed | B4 | 20 | 4 | 55 | 2 | Example |
| 13 | A2 | 600 | Performed | B4 | 40 | 4 | 45 | 2 | Example |
| 14 | A2 | 300 | Performed | B1 | 20 | 1 | 50 | 1 | Example |
| 15 | A2 | 500 | Performed | B2 | 30 | 1 | 55 | 2 | Example |
| 16 | A1 | 1,500 | Not performed | B3 | 30 | 8 | 60 | 2 | Reference Example |
| 17 | A1 | 550 | Not performed | B3 | 25 | 2 | 25 | 2 | Comparative Example |
| 18 | A1 | 550 | Not performed | B3 | 50 | 2 | 50 | 2 | Comparative Example |
| 19 | A1 | 600 | Not performed | B3 | 40 | 1 | 65 | 1 | Comparative Example |
| 20 | A1 | 8 | Not performed | B3 | 35 | 1 | 60 | 1 | Comparative Example |

TABLE 4-continued

| | | Ni coating step | | | Cathode electrolytic treatment step | | | | |
| | | | | | First cathode electrolytic treatment | | Second cathode electrolytic treatment | | |
| Level | Production method | Adhesion amount of Ni coated (mg/m$^2$) | Alloying heat treatment | Chemical treatment liquid | Temperature of chemical treatment liquid (° C.) | Number of times of energization (times) | Temperature of chemical treatment liquid (° C.) | Number of times of energization (times) | Remark |
|---|---|---|---|---|---|---|---|---|---|
| 21 | A1 | 500 | Not performed | B1 | 60 | 1 | — | — | Comparative Example |
| 22 | A2 | 500 | Performed | B4 | 45 | 2 | 45 | 2 | Comparative Example |
| 23 | A1 | 250 | Not performed | B1 | 25 | 2 | — | — | Comparative Example |
| 24 | A1 | 400 | Not performed | B1 | — | — | 55 | 1 | Comparative Example |

<Performance Evaluation>

Regarding the test materials which had been subjected to the above treatments, performance evaluation on each of items (A) to (H) shown below was performed. The evaluation results are shown in Table 5.

(A) Surface Roughness

Arbitrary 20 portions (portions spaced by at least 10 cm or more) per 1 m$^2$ were cut out from the chemical treatment layer side of each test material and surface roughness thereof was measured under the conditions shown in Table 1 with a Pointprobe (registered trademark) NCH-10T (manufactured by Nano World AG). The obtained data was used to obtain each surface roughness (Ra) using Image J (image processing software of the public domain in an open source developed by National Institutes of Health (NIH), USA) which is image processing software and thus the average roughness was obtained.

(B) Yellowness Index

Arbitrary 20 portions (portions spaced by at least 10 cm or more) per 1 m$^2$ were cut out from the chemical treatment layer side of each test material into a size of 50 mm×100 mm to measure the yellowness index (YI$_0$ value). The chemical treatment layer side to be evaluated was set to a front side and was subjected to a retort treatment at 130° C. for 5 hours using a Z clave S-020A (manufactured by MIURA CO., LTD.). When the temperature in the device reached 60° C. or less, the test material was taken out and dried and then the yellowness index (YI value) was measured.

In the measurement of the YI value, the yellowness index (YI$_0$) before a retort treatment and the yellowness index (YI) after a retort treatment were respectively measured in a SCI (including regular reflection light) mode using a spectral colorimeter CM-2600d (manufactured by KONICA MINOLTA JAPAN, INC.). From these values, the absolute value of a ΔYI value, which is a difference between YI and YI$_0$, was obtained and the total value of these was divided by the number of measurement points to obtain the average of the absolute values of the ΔYI values.

(C) Sulfide Stain Resistance

The test material was cut out into a size of 55 mm×55 mm and an end portion (a portion in which the end face of the steel sheet was exposed by shearing) was masked with a tape at a length of 5 mm. The steel sheet was immersed in a 1 mass % Na$_2$S aqueous solution (pH adjusted to 7 with lactic acid) and subjected to a retort treatment at 125° C. for 60 minutes. The external appearance of each steel sheet after the retort treatment was visually evaluated.

The evaluation was made in five stages of Excellent (no discoloration occurred), Good (slight discoloration occurred), Average (discoloration at the same degree as that of a chromate-treated material occurred), Fair (the degree of discoloration was slightly large compared to a chromate-treated material), and Poor (the degree of discoloration was large compared to a chromate-treated material).

The case in which an evaluation result of Average or higher was obtained was evaluated as Pass.

(D) Film Adhesion

A biaxially stretched PET film having a thickness of 20 μm was laminated on both surfaces of the test material at 170° C., and the laminate was subjected to can making by drawing and ironing stepwise. The defect, floating, and peeling of the film were observed and thus the film adhesion was evaluated from the area ratio thereof.

The evaluation was made in five stages of Excellent (the defect, floating, and peeling of the film were not observed at all), Good (the area ratio of the defect, floating, and peeling of the film was more than 0% and 0.5% or less), Average (the area ratio of the defect, floating, and peeling of the film was more than 0.5% and 3% or less), Fair (the area ratio of the defect, floating, and peeling of the film was more than 3% and 15% or less), and Poor (the area ratio of the defect, floating, and peeling of the film was more than 15% or the film was not able to be processed due to breakage).

The case in which an evaluation result of Average or higher was obtained was evaluated as Pass.

(E) Weldability

The test material was welded using a wire seam welding machine, under the condition of a welding wire speed of 80 m/min by varying the current. Based on the overall determination of the width of the proper current range between the minimum current value at which a sufficient weld strength can be obtained, and the maximum current value at which a weld defect such as dust and weld sputter become noticeable, the weldability was evaluated.

The evaluation was made in four stages of Excellent (the proper current range was 1,500 A or more), Good (the proper current range was 800 A or more and less than 1,500 A), Fair (the proper current range was 100 A or more and less than 800 A), and Poor (the proper current range was less than 100 A).

The case in which the evaluation result was Good or higher was evaluated as Pass.

(F) Primary Lacquer Adhesion

An epoxy-phenol resin was applied to the test material and baked at 200° C. for 30 minutes. The resultant coating was incised at intervals of 1 mm to provide a grid pattern so that the depth of the resultant incision reached the base metal and the incised test material was subjected to peeling test by using a tape. The state of peeling of the film was observed and the primary lacquer adhesion was evaluated from the peeling area ratio.

The evaluation was made in four stages of Excellent (the peeling area ratio was 0%), Good (the peeling area ratio was more than 0% and 5% or less), Fair (the peeling area ratio was more than 5% and 30% or less), and Poor (the peeling area ratio was more than 30%).

The case in which the evaluation result was Good or higher was evaluated as Pass.

(G) Secondary Lacquer Adhesion

An epoxy-phenol resin was applied to the test material and baked at 200° C. for 30 minutes. The resultant coating was incised at intervals of 1 mm to provide a grid pattern so that the depth of the resultant incision reached the base metal and then the incised test material was subjected to a retort treatment at 125° C. for 30 minutes. After drying, the lacquer was peeled off by using a tape. The state of peeling of the film was observed and the secondary lacquer adhesion was evaluated from the peeling area ratio.

The evaluation was made in four stages of Excellent (the peeling area ratio was 0%), Good (the peeling area ratio was more than 0% and 5% or less), Fair (the peeling area ratio was more than 5% and 30% or less), and Poor (the peeling area ratio was more than 30%).

The case in which the evaluation result was Good or higher was evaluated as Pass.

(H) Corrosion Resistance

An epoxy-phenol resin was applied to the test material and baked at 200° C. for 30 minutes. Then, a cross-cut was formed into a depth reaching the base metal, and the resultant was immersed into a test liquid made of a liquid mixture of 1.5% citric acid and 1.5% common salt at 45° C. for 72 hours. After washing and drying were performed, tape peeling was performed. The corrosion status under the lacquer of the cross-cut portion and the corrosion status of the flat sheet portion were observed, and the corrosion resistance was evaluated from evaluation of both the width of corrosion under the lacquer and the corrosion area ratio of the flat sheet portion.

The evaluation was made in four stages of Excellent (the corrosion width under the lacquer was less than 0.2 mm and the corrosion area ratio of the flat sheet portion was 0%), Good (the corrosion width under the lacquer was 0.2 mm to less than 0.3 mm and the corrosion area ratio of the flat sheet portion was more than 0% and 1% or less), Fair (the corrosion width under the lacquer was 0.3 mm to less than 0.45 mm and the corrosion area ratio of the flat sheet portion was more than 1% and 5% or less), and Poor (the corrosion width under the lacquer was more than 0.45 mm or the corrosion area ratio of the flat sheet portion was more than 5%).

The case in which the evaluation result was Good or higher was evaluated as Pass.

TABLE 5

| | Film properties | | | | Evaluation result | | | | | | |
|---|---|---|---|---|---|---|---|---|---|---|---|
| | Film component | | Average roughness (nm) | Average of absolute value of ΔYI value | Sulfide stain resistance | Film adhesion | Weldability | Primary lacquer adhesion | Secondary lacquer adhesion | Corrosion resistance | Remark |
| Level | Zr (mg/m$^2$) | P (mg/m$^2$) | | | | | | | | | |
| 1 | 6.3 | — | 16.3 | 0.3 | Good | Excellent-Good | Excellent | Excellent-Good | Good | Good | Example |
| 2 | 9.2 | — | 26.1 | 1.7 | Good | Excellent-Good | Excellent | Excellent-Good | Good | Good | Example |
| 3 | 16.1 | — | 11.3 | 4.8 | Good | Good-Average | Excellent | Excellent-Good | Good | Excellent-Good | Example |
| 4 | 28.1 | — | 96.2 | 0.1 | Excellent | Good | Good | Excellent-Good | Good | Excellent-Good | Example |
| 5 | 6.4 | 2.4 | 34.3 | 1.8 | Excellent | Excellent | Excellent | Excellent | Excellent | Excellent | Example |
| 6 | 28.3 | 18.9 | 77.3 | 0.1 | Excellent | Excellent-Good | Good | Excellent | Excellent | Excellent | Example |
| 7 | 13.9 | 6.6 | 48.6 | 0.3 | Excellent | Excellent | Excellent | Excellent | Excellent | Excellent | Example |
| 8 | 12.5 | 1.6 | 40.8 | 0.6 | Excellent-Good | Excellent-Good | Excellent | Excellent-Good | Excellent-Good | Excellent-Good | Example |
| 9 | 7.5 | 3.8 | 16.2 | 1.2 | Excellent-Good | Excellent-Good | Excellent | Excellent | Excellent | Excellent | Example |
| 10 | 5.1 | — | 13.6 | 4.2 | Good-Average | Good-Average | Excellent | Excellent-Good | Good | Good | Example |
| 11 | 10.8 | — | 21.3 | 0.2 | Good | Good | Excellent | Excellent-Good | Good | Good | Example |
| 12 | 15.6 | 8.8 | 44.9 | 0.3 | Excellent | Excellent | Excellent | Excellent | Excellent | Excellent | Example |
| 13 | 12.5 | 8.3 | 49.2 | 3.8 | Good-Average | Excellent | Excellent | Excellent | Excellent | Excellent | Example |
| 14 | 13.4 | — | 39.2 | 2.4 | Good | Excellent-Good | Good | Excellent | Good | Excellent | Example |
| 15 | 18.2 | — | 21.5 | 4.1 | Excellent | Excellent-Good | Good | Excellent-Good | Excellent-Good | Good | Example |
| 16 | 13.9 | 6.6 | 58.6 | 0.3 | Excellent | Excellent | Excellent | Excellent | Excellent | Excellent | Reference Example |
| 17 | 11.8 | 5.3 | 9.8 | 0.3 | Excellent | Fair-Poor | Excellent | Excellent | Excellent | Excellent | Comparative Example |
| 18 | 12.1 | 5.6 | 109.3 | 13.4 | Poor | Good | Good-Fair | Good-Fair | Fair | Fair-Poor | Comparative Example |

TABLE 5-continued

| | Film component | | Film properties | | Evaluation result | | | | | | |
|---|---|---|---|---|---|---|---|---|---|---|---|
| | | | Average roughness (nm) | Average of absolute value of ΔYI value | Sulfide stain resistance | Film adhesion | Weldability | Primary lacquer adhesion | Secondary lacquer adhesion | Corrosion resistance | Remark |
| Level | Zr (mg/m$^2$) | P (mg/m$^2$) | | | | | | | | | |
| 19 | 6.0 | 1.5 | 41.3 | 7.3 | Poor | Fair | Excellent-Good | Good-Fair | Fair | Fair-Poor | Comparative Example |
| 20 | 4.8 | 2.5 | 45.3 | 7.8 | Fair-Poor | Fair | Excellent | Good-Fair | Fair | Poor | Comparative Example |
| 21 | 33.6 | — | 111.6 | 8.3 | Poor | Good | Fair-Poor | Fair | Fair-Poor | Fair | Comparative Example |
| 22 | 42.6 | 21.4 | 96.2 | 5.3 | Fair-Poor | Good-Average | Poor | Good-Fair | Fair | Good-Fair | Comparative Example |
| 23 | 12.5 | — | 115.1 | 6.9 | Fair | Poor | Good | Fair | Good | Poor | Comparative Example |
| 24 | 14.3 | — | 118.9 | 7.4 | Poor | Fair | Fair | Poor | Fair | Good | Comparative Example |

All Levels 1 to 15 belonging to the range of the present invention had a surface roughness (Ra) of 10 nm to 100 nm and an average of the absolute values of ΔYI values of 5.0 or less. Levels 1 to 15 had excellent sulfide stain resistance, weldability, primary lacquer adhesion, secondary lacquer adhesion, and corrosion resistance.

Particularly, in the case where the chemical treatment layer contained 2 mg/m$^2$ or more of phosphate in terms of the amount of P, further excellent film adhesion, sulfide stain resistance, and corrosion resistance were exhibited.

On the other hand, it was found that in Comparative Examples 17 to 24 not satisfying either requirement of the surface roughness (Ra) or the ΔYI value of the present invention, at least one of properties of film adhesion (including workability), sulfide stain resistance, weldability, primary lacquer adhesion, secondary lacquer adhesion, and corrosion resistance was deteriorated.

It was found that Level 16 was a case in which the amount of Ni is increased than the defined amount, but the performance of the chemical treatment layer was saturated.

While the suitable embodiments of the present invention have been described above in detail, the present invention is not limited to these embodiments. It is understood by those skilled in the art to which the present invention belongs that it is apparent that various alterations and modifications can be made within the category of the technical concept described in the appended claims and thus the examples naturally belong to the technical scope of the present invention.

INDUSTRIAL APPLICABILITY

According to the present invention, it is possible to provide a steel sheet for containers having excellent film adhesion, sulfide stain resistance, weldability, corrosion resistance, and lacquer adhesion, and a method for producing a steel sheet for containers. Accordingly, the present invention has sufficient industrial applicability.

BRIEF DESCRIPTION OF THE REFERENCE SYMBOLS

1 steel sheet for containers
2 steel sheet
3 Ni coated layer
4 chemical treatment layer

The invention claimed is:

1. A steel sheet for containers comprising:
a steel sheet;
a Ni coated layer on at least one surface of the steel sheet; and
a chemical treatment layer on the Ni coated layer,
wherein:
the Ni coated layer contains 10 mg/m$^2$ to 1,000 mg/m$^2$ of Ni in terms of an amount of metal Ni;
the chemical treatment layer contains 5 mg/m$^2$ to 30 mg/m$^2$ of a Zr compound in terms of an amount of metal Zr;
an average roughness Ra of an outermost surface of the chemical treatment layer, measured with a scanning probe microscope, is 10 nm to 100 nm;
ΔYI, which is a variation amount in a yellowness index measured at one measurement point on the outermost surface of the chemical treatment layer, is represented by Equation (2), $$\Delta YI = Y1 - YI_0 \qquad \text{Equation (2),}$$

where, in Equation (2):
YI represents the yellowness index measured at said one measurement point after the steel sheet for containers is subjected to a retort treatment at a temperature of 130° C. for 5 hours, and
YI$_0$ represents the yellowness index measured at said one measurement point before said retort treatment; and
an average of absolute values of multiple ΔYI values, obtained at a plurality of measurement points included in a unit area of the outermost surface of the chemical treatment layer, is 5.0 or less, wherein the multiple ΔYI values are obtained at 20 arbitrary points located within 1 m$^2$ of the outermost surface of the chemical treatment layer.

2. The steel sheet for containers according to claim 1, wherein the Ni coated layer contains a Ni alloy.

3. The steel sheet for containers according to claim 1, wherein the chemical treatment layer contains 2 mg/m$^2$ to 20 mg/m$^2$ of a phosphate compound in terms of an amount of P.

4. The steel sheet for containers according to claim 1, wherein the chemical treatment layer is formed by performing a cathode electrolytic treatment in a chemical treatment liquid that contains a Zr ion and a F ion.

5. The steel sheet for containers according to claim 3, wherein the chemical treatment layer is formed by performing a cathode electrolytic treatment in a chemical treatment liquid that contains a Zr ion, a F ion, and a phosphate ion.

6. The steel sheet for containers according to claim 2, wherein the chemical treatment layer contains 2 mg/m$^2$ to 20 mg/m$^2$ of a phosphate compound in terms of an amount of P.

7. The steel sheet for containers according to claim 2, wherein the chemical treatment layer is formed by performing a cathode electrolytic treatment in a chemical treatment liquid that contains a Zr ion and a F ion.

8. The steel sheet for containers according to claim 6, wherein the chemical treatment layer is formed by performing a cathode electrolytic treatment in a chemical treatment liquid that contains a Zr ion, a F ion, and a phosphate ion.

9. A method for producing a steel sheet for containers according to claim 1, comprising:
 a Ni coating step of forming a Ni coated layer that contains 10 mg/m$^2$ to 1,000 mg/m$^2$ of Ni in terms of an amount of metal Ni on at least one surface of a steel sheet;
 a cathode electrolytic treatment step of forming a chemical treatment layer on a surface of the Ni coated layer using a chemical treatment liquid that contains at least a Zr ion and a F ion, by performing a first cathode electrolytic treatment in which the temperature of the chemical treatment liquid is 10° C. to 40° C. and a second cathode electrolytic treatment in which the temperature of the chemical treatment liquid is 45° C. to 60° C.; and
 a washing treatment step of performing a washing treatment using washing water at least 40° C. or higher for 0.5 seconds or longer.

10. The method for producing a steel sheet for containers according to claim 9, comprising:
 an alloying heat treatment step of alloying at least a part of the Ni coated layer after the Ni coating step.

11. The method for producing a steel sheet for containers according to claim 9,
 wherein the chemical treatment liquid contains at least one of a phosphate ion, a nitrate ion, or an ammonium ion.

12. The method for producing a steel sheet for containers according to claim 10,
 wherein the chemical treatment liquid contains at least one of a phosphate ion, a nitrate ion, or an ammonium ion.

* * * * *